United States Patent [19]

De Chant

[11] 4,172,676
[45] Oct. 30, 1979

[54] TURNBUCKLE ASSEMBLY

[75] Inventor: Donald W. De Chant, North Olmsted, Ohio

[73] Assignee: Eaton Corporation, Cleveland, Ohio

[21] Appl. No.: 941,499

[22] Filed: Sep. 11, 1978

[51] Int. Cl.² .......................... F16B 7/06; F16G 11/12
[52] U.S. Cl. .................................... 403/43; 29/175 R;
    403/287; 403/289; 403/302; 403/342
[58] Field of Search ...................... 403/43, 44, 21, 164,
    403/301, 302, 313, 331, 342, 344, 287, 289, 290,
    299, 309, 406; 29/175

[56] References Cited

U.S. PATENT DOCUMENTS

| 2,869,883 | 1/1959 | Dunbar | 403/342 X |
| 3,413,021 | 11/1968 | Potts | 403/289 X |
| 3,736,011 | 5/1973 | Ward | 403/342 X |

FOREIGN PATENT DOCUMENTS 819887  9/1959  United Kingdom ..................... 403/342

Primary Examiner—Wayne L. Shedd
Attorney, Agent, or Firm—R. J. McCloskey; H. D. Gordon

[57] ABSTRACT

An improved turnbuckle assembly comprising a one-piece generally tubular stamped clip and a nut member mounted to a first axial end of said clip for rotative motion relative thereto is provided. The other axial end of said clip is adapted to receive and retain the end of a flexible cable, such as a multi-strand metallic brake cable, having an enlarged ring or sleeve member permanently attached thereto. The improvement comprises providing a multiplicity of axially extending slits in the first axial end of the stamped clip which allows the bearing area for retaining the nut member against axial forces to be increased while permitting relative ease of assembly. Preferably, the bearing areas will comprise circumferentially extending radially raised ribs having a surface thereof extending radially inwardly toward said first axial end of said clip.

3 Claims, 10 Drawing Figures

TURNBUCKLE ASSEMBLY

BACKGROUND OF THE INVENTION

1. Field of the Invention

The present invention relates to an improved turnbuckle assembly and in particular relates to an improved turnbuckle assembly comprising a one-piece stamped clip having a generally tubular shape and a nut member mounted at a first axial end of said clip for rotative motion relative thereto, said first end of said clip being provided with a plurality of axially extending slits to allow for increased bearing area to resist axial removal of the nut member and to allow relative easy assembly of the nut member to the clip and the other axial end of the clip being adapted to receive and retain the end of an elongated member, such as a cable, having an enlarged ring or sleeve member permanently attached thereto.

2. Description of the Prior Art

Turnbuckle assemblies comprising stamped, one-piece generally tubular clips having a nut member rotationally mounted at one end thereof and being adapted at the other end to receive and retain an elongated member such as a cable, are known in the prior art. The prior art devices have been less than satisfactory in certain situations as a large axial tension force tended to separate the nut member from the stamped clip and/or excessive force was required to assemble the nut member to the stamped clip.

SUMMARY OF THE INVENTION

In accordance with the present invention, the drawbacks of the prior art have been overcome to the extent that a more easily assembled turnbuckle assembly capable of withstanding relatively large axial tensions without separation is provided. The above is accomplished by providing relatively large bearing areas at a first axial end of the stamped clip to retain the nut member and by providing a plurality of axially extending slits in the first axial end of the stamped clip allowing the bearing areas to be resiliently deflected inwardly during assembly of the nut member to the clip. Preferably, the bearing areas comprise a plurality of radially raised circumferentially extending ribs having a surface thereof tapering radially inwardly toward the first end of the clip.

Accordingly, it is the object of the present invention to provide a new and improved turnbuckle assembly which is capable of withstanding relatively large axial tension forces without separation and is relatively easily assembled.

This and other objects and advantages of the present invention will become apparent from a reading of the description of the preferred embodiment of the invention taken in connection with the attached drawings.

DESCRIPTION OF THE PREFERRED EMBODIMENT

Figure 1:
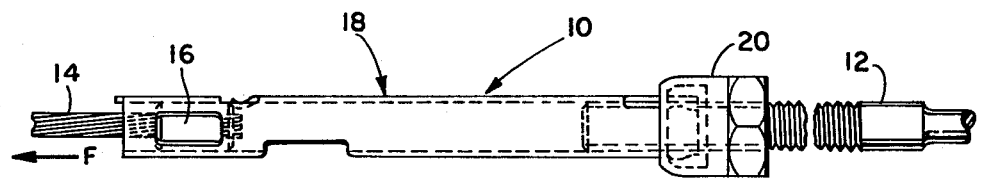
FIG. 1 is an elevational view of the turnbuckle assembly of the present invention as assembled to a threaded rod at the first end thereof and retaining a brake cable at the other end thereof.
Figure 2:
FIG. 2 is a fragmentary elevational view of the end of a brake cable of the type which the assembly of the present invention is designed to receive and retain.
Figure 3:
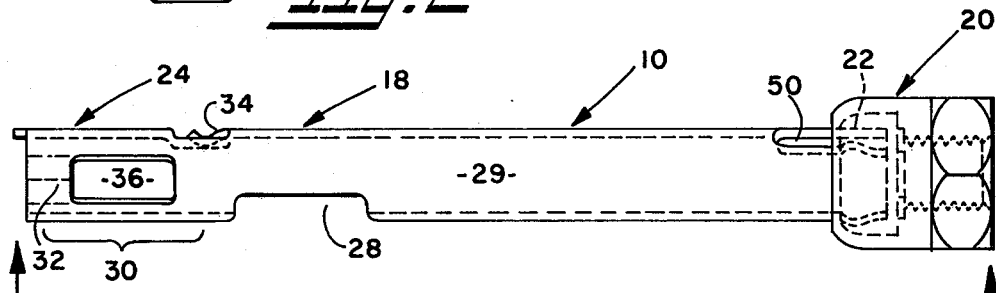
FIG. 3 is an elevational view of the turnbuckle assembly of the present invention.
Figure 4:
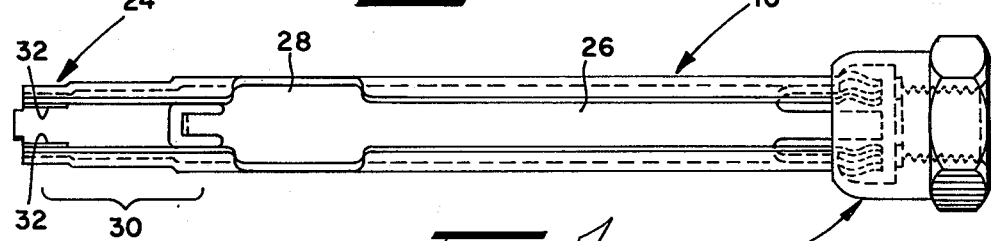
FIG. 4 is a bottom view of the turnbuckle assembly of the present invention.

The improved turnbuckle assembly 10 of the present invention, as retained on the externally threaded end of a rod member 12, and as axially retaining the end of a brake cable 14, may be seen by reference to FIG. 1. Briefly, it is the purpose of the turnbuckle assembly of the present invention to attach the rod member 12 to the brake cable 14 so that an axial tension force may be applied to the rod 12 from the cable 14 and to maintain the cable 14 at a tension within predetermined limits. As may be seen in FIG. 2, the axial end of the brake cable 14 includes an enlarged ring or sleeve member 16 permanently attached thereto.

The turnbuckle assembly 10 comprises a generally tubular, stamped, one-piece clip 18 having a nut member 20 attached at a first end 22 thereof for rotative motion relative thereto and being adapted to receive and axially retain the end of the brake cable 14 at the other end 24 thereof. As is well known in the art, rotation of the nut member 20 will vary the tension of a retained brake cable 14 by axially moving the turnbuckle assembly 10 relative to the rod 12. In operation, a tension force represented by the arrow F (pointing to the left in the drawing) will be applied to the cable 14 and transmitted to the rod 12 through turnbuckle assembly 10. Nut member 20 must thus be retained on clip 18 in a manner sufficient to resist separation under the influence of tension force F. The turnbuckle assembly allows for easy attachment of the cable 14 to the rod 12 and permits adjustment for inaccuracies in the length of cable 14 relative to the end of rod 12.

Figure 5:
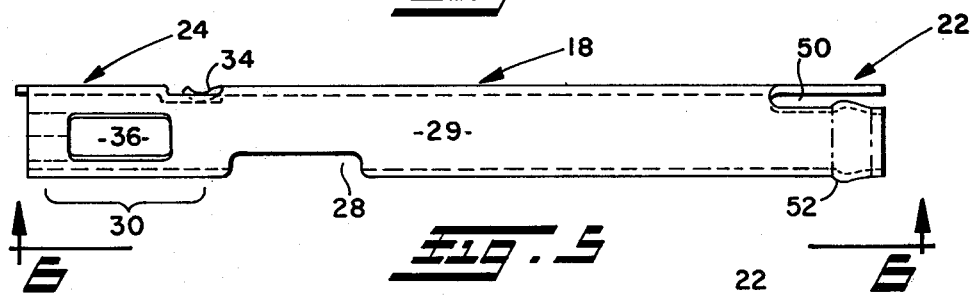
FIG. 5 is an elevational view of the one-piece stamped clip.
Figure 6:
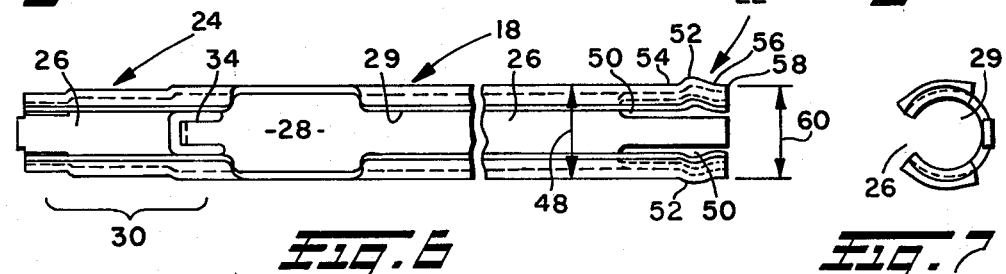
FIG. 6 is a bottom view of the stamped clip.
Figure 7:
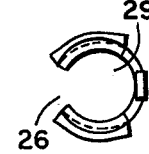
FIG. 7 is a side view of the stamped clip.

As may be seen by reference to FIGS. 5–7, the stamped, one-piece clip 18 is of a generally tubular shape defining an axially extending through bore 29 and having an axially extending opening 26 whereby the clip has a generally C-shaped cross section taken on a plane perpendicular to the axis of the tubular shaped body, as may be seen by reference to FIG. 7. Preferably, the inner diameter of bore 29 is slightly greater than the outer diameter of sleeve 16. The axially extending opening 26 is of any chordal distance which is less than the diameter of the enlarged ring or sleeve member 16 but greater than the diameter of the cable 14. The other end, 24, of the clip 18 is functionally and/or structurally identical to the other end 124 of the prior art clips 118 as may be seen by reference to FIGS. 9 and 10 and forms no part of the improvement of the present invention. Briefly, spaced axially inward from the other end 24 of clip 18 is an enlarged portion 28 of the axial extending opening 26. The enlarged portion, or window, 28, is of a chordal and circumferential extension sufficient to receive the enlarged ring or sleeve member 16 therein. Located axially between the other end 24 of the clip and the window 28 is a cable sleeve retaining portion 30. Cable sleeve retaining portion 30 includes means such as radially inwardly extending protrusions 32 which will prevent a cable sleeve 16 which is received in the axially extending bore 29 of the clip member 18 from moving axially toward the end 24 of the clip 18 (to the left as seen in the drawings). The cable retaining portion 30 also includes a one-way ramp member 34 which will permit the cable sleeve to move to the left in the bore 29 but will not, in the non-deformed position, permit movement of the cable sleeve 16 to the right in bore 29. In operation, the cable sleeve 16 is placed into the axially extending bore 29 of clip 18 through the enlarged opening or window 28 with the cable passing through the opening 26 into the bore 29. The cable is then moved leftwardly relative to the clip forcing the ramp member 34 to move resiliently outwardly until the sleeve 16 moves to the left thereof and engages the inwardly extending protrusion 32. At this point, the ramp 34 will resiliently return to its non-deformed position and the cable sleeve 16 will be axially trapped between the protrusions 32 and the ramp 34. As the assembly is normally exposed to a greater tension than a compressive force, the resistance to rightward movement of cable sleeve 16 need not be of great magnitude. Preferably, the cable sleeve retaining portion 30 will be provided with cut out portions 36 which will allow the entrapped cable sleeve 16 and the cable attached thereto to rotate relative to the stamped clip 18.

Figure 8:
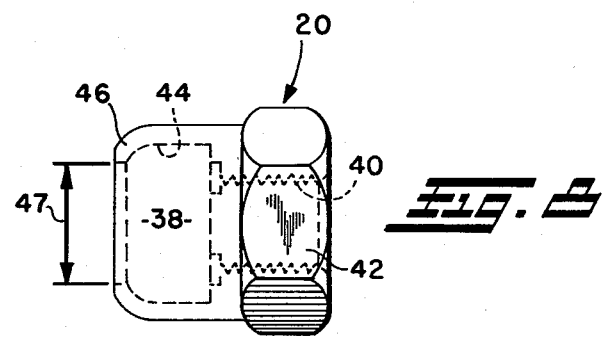
FIG. 8 is an enlarged elevational view of the nut member of the present invention.

The nut member 20 of the improved toggle assembly of the present invention 10, may be seen in greater detail by reference to FIG. 8. The nut member is generally tubular in shape and defines an internal bore 38 having a reduced internal diameter portion 40 carrying internal threads 42 at one axial end thereof and an enlarged internal diameter portion 44 at the other end thereof. The body of the nut is turned radially inwardly of the axial end thereof most distant the threaded portion to define a radially inwardly extending annular flange 46. The interior diameter 47 of bore 38 at flange 46 is preferably somewhat greater than the exterior diameter 48 of the tubular stamped clip 18 near the first axle end 22 thereof.

The first axial end 22 of the stamped clip 18 defines at least one axially extending slot 50 which is generally parallel to opening 26. Adjacent the first end 22 of the clip 18 are a plurality of circumferentially extending axially raised ribs 52, the outer diameter of the raised rib portion being greater than the interior diameter 47 of the nut member 20 at the radially inwardly extending flanges 46. The surfaces 54 of the circumferentially extending radially raised ribs 52 extend sharply outwardly from the exterior surface of the clip 18, preferably at an angle of greater than 50° relative to the axis of bore 29 and provide the bearing area for resisting axial removal of the nut member 20 from the clip member 18 in an assembled turnbuckle assembly 10. The other surface 56 of the raised rib 52 extends radially inwardly and toward end 22 of clip member 18. Surface 56 preferably terminates at an edge 58 having an outer diameter 60 which is smaller than the interior diameter 47 of nut 20 at the radially inwardly extending flanges 46 of nut member 20. The combination of the circumferentially extending axially raised ribs 52, the radially inwardly sloping surfaces 56 thereof and the axially extending slots 50 allow the clip member 18 to be inserted into the enlarged interior diameter portion 38 of nut 20 with a minimum of effort and the sharply radially outwardly extending surfaces 54 provide excellent resistance to axial removal of the nut member from the clip member. Such ease of assembly also permits the ribs to extend for a greater circumferential extension than heretofor possible and to have a greater radially outward extension both of which provide a greater bearing area to resist axial removal of the nut 20 from the clip 18.

Figure 9:
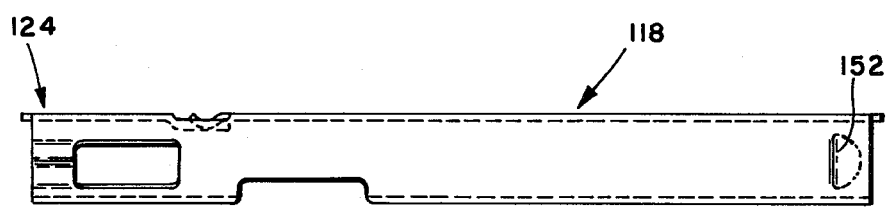
FIG. 9 is an elevational view of a prior art stamped clip.
Figure 10:
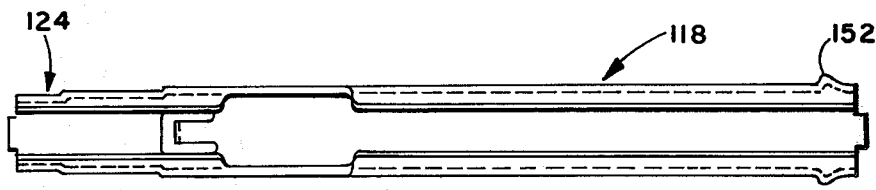
FIG. 10 is a bottom view of the prior art stamped clip of FIG. 9.

The clip 118 prior art devices may be seen by reference to FIGS. 9 and 10. As may be seen by reference to FIG. 9, the ribs 152 of prior art stamped clip 118 were of considerably less circumferential and radial extension than ribs 52 of the clip 18 as the prior art clips were not as easily inserted into the nut and enlargement of said raised ribs might have prevented such assemblies of the clip 118 to the nut member without undue difficulty and expense.

Although this invention has been described in its preferred form with a certain degree of particularity, it is understood that the present disclosure of the preferred form has been made only by way of example and that numerous changes in the details of construction and combination and arrangement of parts may be resorted to without departing from the spirit and the scope of the invention as hereinafter claimed.

I claim:

1. An improved turnbuckle assembly of the type comprising a one-piece stamped clip having a generally tubular body and a nut member axially fixed to said body at a first end thereof for rotative motion relative thereto, said nut member having an annular inwardly extending flange at one axial end thereof, the interior diameter of said nut member at said flange being greater than the exterior diameter of said clip, the other end of said clip being adapted to receive and retain an elongated member having a radially enlarged portion adjacent the end thereof received by the clip, the improvement comprising:

a plurality of axially extending slits formed in said first end of said clip and a plurality of radially outwardly extending ribs circumferentially extending about at least a portion of said clip at said first end thereof.

2. The improved turnbuckle assembly of claim 1 wherein said ribs have a first surface facing that first end of said clip and a second surface facing the other end of said clip, said second surface extending from the outer surface of said clip at an included angle of at least 50° with respect to the axis of said clip and said second surface extending substantially continuously to said first end of said clip and terminating at the edge of said clip and defining thereat an exterior diameter smaller than the interior diameter of said nut member at said radially inwardly extending flange.

3. The improved clip of claim 2 wherein a raised rib extends from slot to slot on at least two portions of said first axial end of said clip.

* * * * *